MAGNETIC SECOND HARMONIC ANALOG DEVICE

Filed Sept. 10, 1965

INVENTOR:
DAVID L. GREER,
BY Richard V. Lang
HIS ATTORNEY.

INVENTOR:
DAVID L. GREER,
BY [signature]
HIS ATTORNEY.

United States Patent Office 3,422,277

Patented Jan. 14, 1969

3,422,277

MAGNETIC SECOND HARMONIC ANALOG DEVICE

David L. Greer, Manlius, N.Y., assignor to General Electric Company, a corporation of New York Filed Sept. 10, 1965, Ser. No. 486,483

U.S. Cl. 307—88 9 Claims

Int. Cl. H01f *3/00;* H03f *9/00, 11/00*

Figures 1, 2:
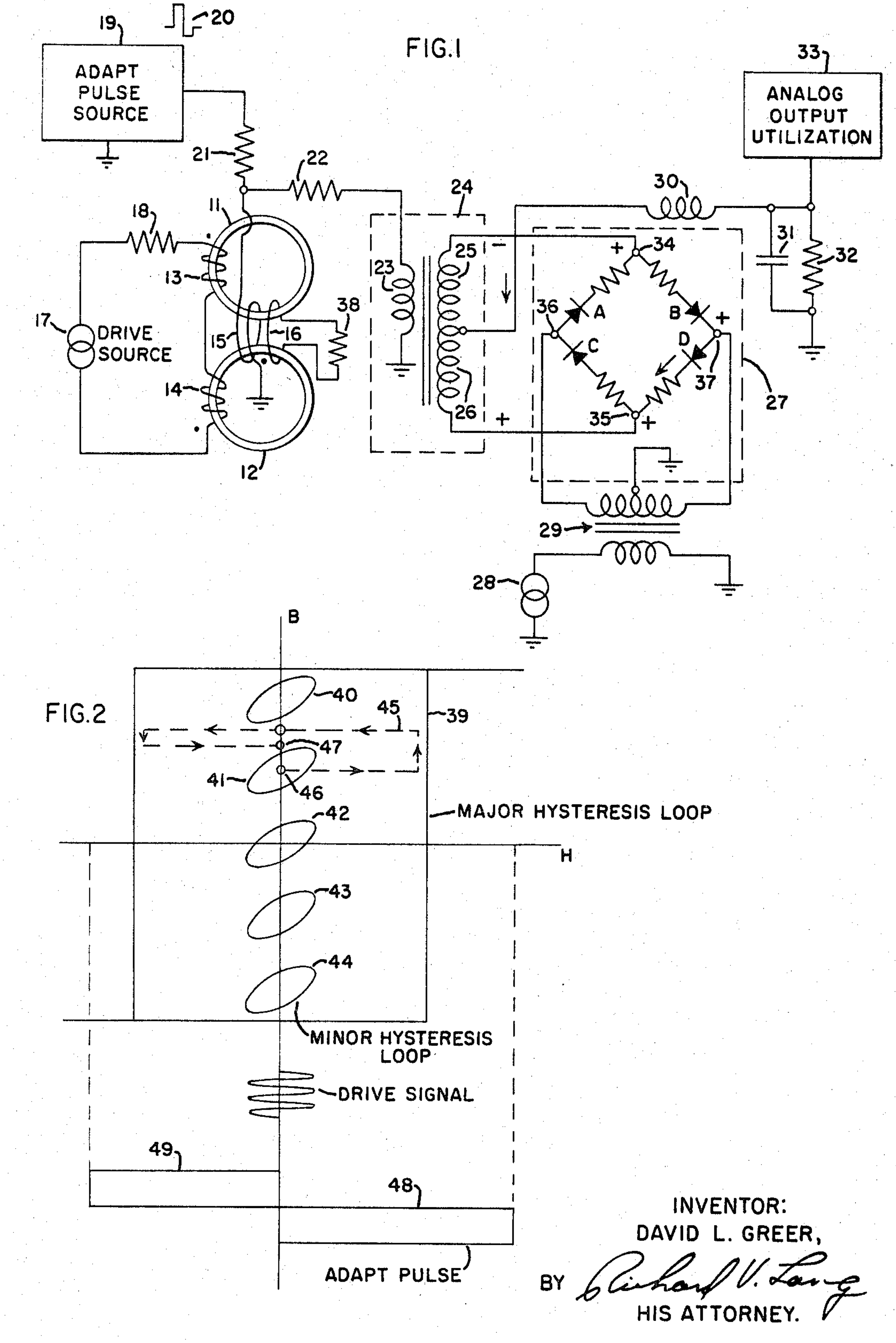

This invention relates to information processing and, more particularly, to magnetic second harmonic analog devices having application to integration and storage as well as to counting and digital to analog conversion.

Substantial research and development effort has been expended in recent years in the search for an economical analog memory device which is capable of operating at relatively high speeds, retains a stored value for long periods, and which may be accurately read out on-demand and without destruction of the stored value. Reference to these developments has been made in the IEEE Transactions on Electronic Computers, August 1963, pages 388 to 393 in an article entitled, "A Survey of Analog Memory Devices," by George Nagy. Another article dealing with the same topic appearing in Electronics, Mar. 22, 1963, pages 49 to 53, entitled, "Components That Learn and How To Use Them," by Harold S. Crafts.

A prominent new class of devices are the magnetic second harmonic analog memory devices. The storage capability of these devices is based upon the effect of magnetic remanence of the device's core upon the production of a second harmonic output in a winding coupled to that core, when these devices are subjected to constant amplitude alternating excitation. The level of magnetic remanence, and hence the second harmonic output signal, can be changed at will by introducing one or more "adapt" pulses, which step the core into successive remanent states.

Magnetic remanent states have a high degree of permanence, as is well known, and may be used to advantage to perform integrating and memory functions. In performing such functions as counting or digital to analog conversion, the memory function may be used to make the output available for longer time periods than conventional devices and to perform that function without impairment from power or other operating failures. The remanent condition of a magnetic core survives the discontinuance of alternating excitation, making it possible for the memory associated with the remanent condition to persist without the continuing application of excitation energy. If excitation is discontinued, upon its reinstitution, the second harmonic signal indicative of the continuing remanent state of the core is re-established in the output of the device and the information stored therein is again made available for readout.

Second harmonic analog devices may take several forms. Two common types which have been described in the literature are those employing single and those employing double toroidal cores. In its simplest configuration, the double core arrangement requires a pair of excitation windings and an output winding. The output winding may also be used for stepping the core by the application of signal input or "adapt" pulses. The excitation windings are each coupled to one of the toroidal cores and are dimensioned and poled to induce equal and opposite signals in the output winding which is coupled to both toroidal cores. This arrangement provides a simple means of cancelling the fundamental and all harmonic frequencies of the excitation supply and simplifies the eventual derivation of the second harmonic produced as a result of magnetic remanence. This device is described in the two cited articles. The alternating output may be detected and converted to a direct potential whose magnitude indicates the stored analog value.

Second harmonic analog devices may also employ single toroids which, when appropriately excited, produce a second harmonic component in an output winding. In the single core configuration, the desired second harmonic component is usually separated from the fundamental by means of a filter. This latter arrangement saves the cost of one core at the expense of added complexity in the sensing and excitation circuitry.

There are certain problems which attend the practical application of known magnetic second harmonic analog devices, and it would appear that these problems are inherent in devices depending upon this principle of operation. The first problem is that of simple non-linearity in the second harmonic characteristic as it is measured, after detection and filtering of the alternating output. When the known double core device is used with equal valued uni-polar pulses for stepping up the remanent states of the cores, the second harmonic output derived from an excitation signal is found to depart from exact proportionality to the number of pulses previously applied. The departure becomes greater as one approaches saturation. The core will, however, give an approximate indication of the number of applied stepping pulses, and it will therefore perform an approximate integration of these pulses. By the addition of suitable feedback measures, a substantial improvement in linearity may be achieved.

The second problem which confronts the application of these devices is one which cannot be overcome by feedback measures. Uncorrected, it constitutes as severe a limitation upon the successful operation of these devices as the non-linearity referred to above. It is the problem to which the present invention is directed. When one follows one or more positive pulses by a negative pulse or one or more negative pulses by a positive pulse, an indication of erroneous magnitude appears in the detected and filtered second harmonic component. The initial pulse which has a different sign from the preceding pulses has been found to give a disproportionately large harmonic output. In an application in which polarity reversals occur, as in the typical integrator, it is found necessary to restrict the number of usable remanent states to a small number so as to avoid the ambiguity arising from this disproportionality.

An object of the present invention is to provide an improved magnetic second harmonic analog device in which the disproportionality arising from polarity reversals in the stepping pulses is reduced, thereby permitting the use of an increased number of distinguishable remanent states.

It is therefore a general object of this invention to provide an improved magnetic second harmonic analog device.

It is a further object of the invention to provide a magnetic second harmonic analog device which provides improved linearity between the signal input or "adapt" input and the analog output indication.

In accordance with one aspect of the invention, a novel second harmonic analog device is provided including a saturable magnetic core structure having a hysteresis characteristic which is subjected to alternating electrical excitation adjusted to cycle said core structure over closed minor hysteresis loops for the production of substantial second harmonic content in the resulting rate of change of flux. Analog output means are provided coupled to the core structure for sensing the magnitude of the second harmonic component of said rate of change of flux and novel stepping means are provided coupled to the core structure including means for applying a composite pulse thereto, the composite pulse having an initial portion of one polarity and a subsequent portion of opposing polarity and lesser magnitude. The composite stepping pulse steps the core in the direction indicated by the initial portion of composite pulse. By inverting both portions of the composite pulse, the direction of stepping is reversed.

It has been found that the application of this composite pulse simply facilitates the substantially complete elimination of the disproportionate indication produced by pulse reversals occurring on changes in the direction of counting. When the count reversal problem is eliminated by applicant's novel means, and suitable feedback measures are introduced to linearize the output characteristic, it has been found possible to achieve a ten fold increase in usable remanent states over that of a device lacking these improvements.

Figure 3A:
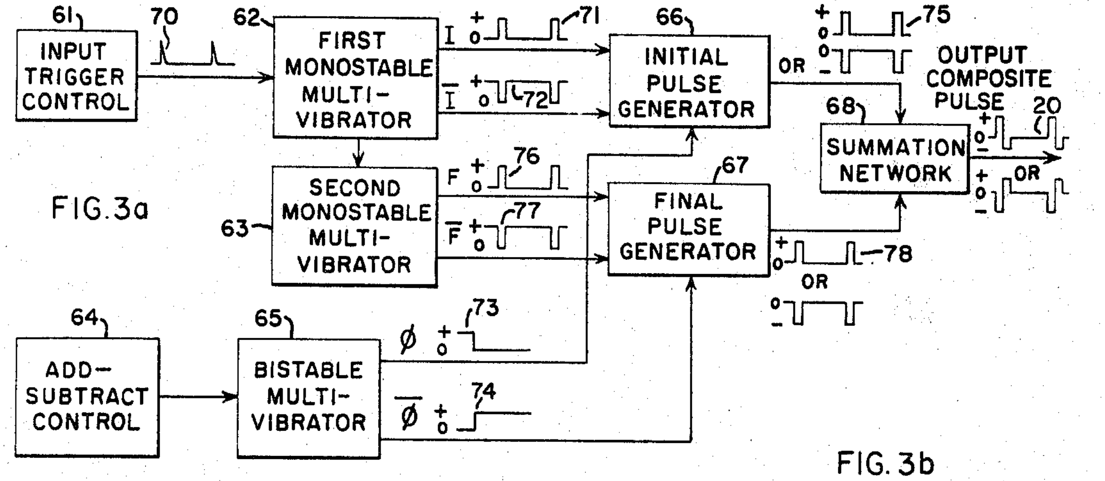
Figures 3B, 3C:
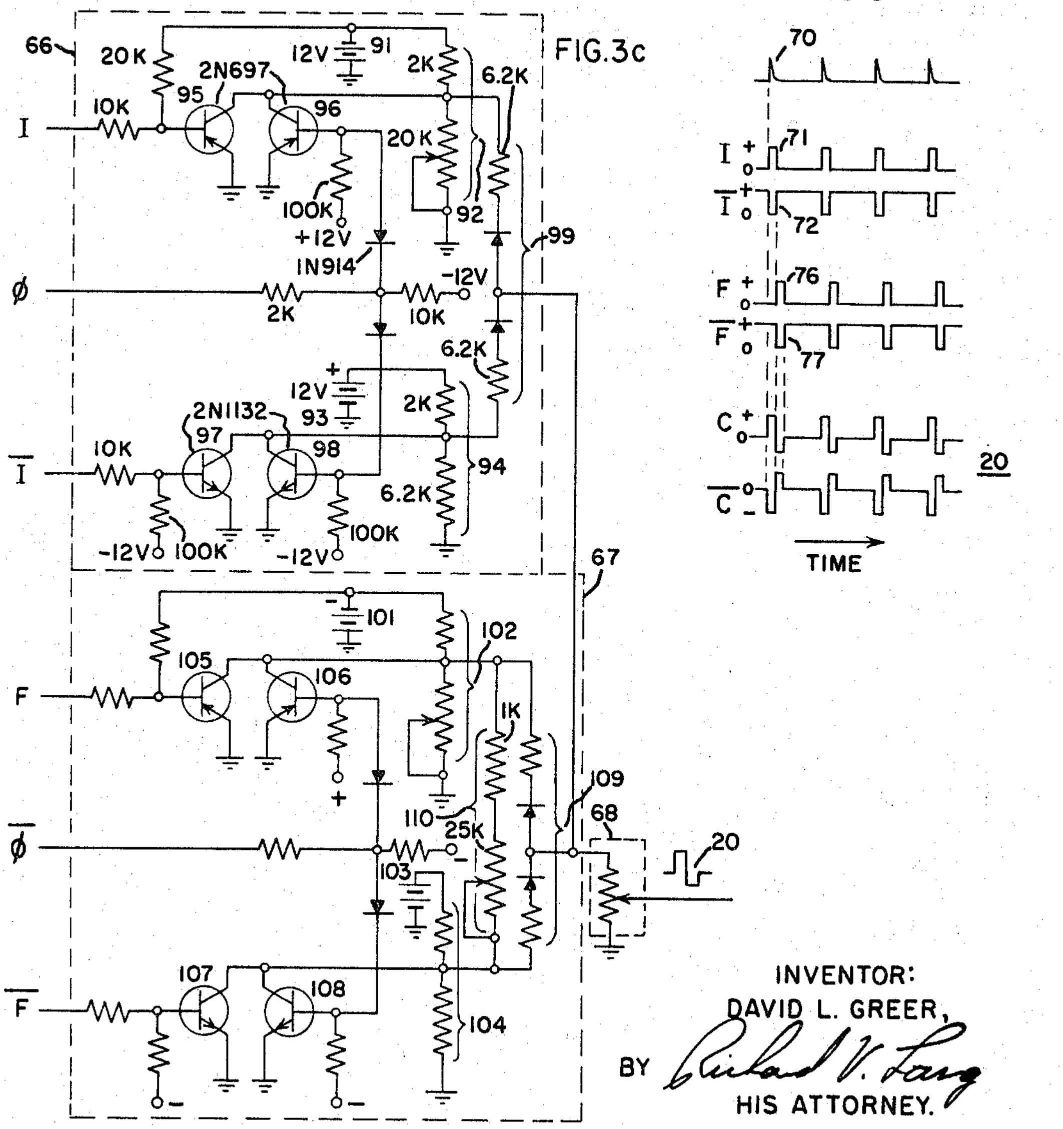

The subject matter of the invention is more particularly described in the foregoing specification and its scope is more distinctly set forth in the appended claims. For a more comprehensive understanding of the invention, together with additional objects, advantages and an explanation of the manner in which the invention may be practiced, reference is now made to the following description of exemplary embodiments as illustrated in the following figures:

FIGURE 1 is a schematic diagram of a novel second harmonic analog memory device embodying the invention;

FIGURE 2 is an illustration of the magnetic operation of the novel second harmonic analog memory device under the influence of the applied high frequency excitation and the stepping or adapt pulses; and FIGURE 3(*a*) is a block diagram of an adapt pulse generator which may be used in the novel second harmonic device; FIGURE 3(*b*) illustrates waveforms useful in explaining the operation of this adapt pulse generator; and FIGURE 3(*c*) is a schematic diagram of the final portions of the adapt pulse generator.

Considering FIGURE 1; a schematic representation of a magnetic second harmonic analog device in accordance with the invention is shown. It performs integration. The analog device comprises a pair of toroidal cores 11 and 12, each having an individual excitation winding 13 and 14 respectively, and both sharing a common signal winding 15 and a common feedback winding 16. A source 17 of "drive" or alternating excitation potentials is coupled through resistance 18, to windings 13 and 14, all serially connected. The poling and number of turns of windings 13 and 14 are arranged to produce flux in the core members 11 and 12 of equal magnitude and opposite phase at the signal winding 15.

A source of "adapt" or input pulses is shown at 19, the composite pulse produced at the output terminal of this source being illustrated at 20. The adapt pulse source 19 is coupled through an isolating resistance 21 to one terminal of the signal winding 15. Both the adapt pulse source 19 and the signal winding 15 are grounded to provide return paths. In order to linearize the operation of the analog device, and for other purposes as will be further explained below, a feedback winding 16 is shown linking both cores in the same manner as the signal winding 15. It is in turn shunted by a dissipative element 38.

The analog signal output, which is synchronously detected in a balanced demodulator circuit and filtered, is derived from the signal winding 15, the output signal connection being taken through an isolating resistance 22 coupled to the ungrounded terminal of the signal winding 15. The other terminal of resistance 22 is connected to the primary 23 of a transformer 24. The other terminal of the primary 23 is grounded. The secondary of the transformer 24 comprises a pair of balanced windings 25 and 26, each having one terminal joined to form a center tap and each having a remaining terminal respectively coupled to a first pair of diagonal terminals 34, 35 of a diamond connected rectifier 27 performing the synchronous detection function. The rectifier 27 consists of four diodes, A, B, C, D, connected to form a closed diamond configuration and each poled for clockwise current flow (as illustrated in FIGURE 1) and each diode having a serially connected resistance. The bridge rectifier 27 has its remaining pair of diagonal terminals 36, 37 energized by a source of alternating potentials 28 coupled thereto through transformer 29 having a balanced secondary with a grounded center tap. The source 28 produces alternating potentials at twice the frequency of source 17 and has a predetermined timing relationship therewith (one in which alternate zero crossings of source 17 are approximately coincident with those of source 28). The transformer 24, and the rectifier 27 and the elements 28 and 29, function as a balanced demodulator to synchronously detect the alternating voltage appearing across the winding 23 of the transformer 24.

The detected output is coupled from the center tap of transformer 24 to a low-pass filter comprising serially connected inductor 30 and a shunt connected capacitor 31 and shunt connected load resistance 32 to the analog output utilization device 33. The detected output takes the form of a direct voltage whose magnitude is the integration of the signal pulses applied by the source 19.

Considering the operation of the arrangement of FIGURE 1 in greater detail, supplemental reference is now made to FIGURE 2 which is a graph illustrating the stepping and excitation of the individual core members 11 and 12. The major hysteresis loop of one core is illustrated at 39. Under the influence of the stepping pulses from source 19, successive portions of that loop are encountered as successive stepping pulses are applied. The alternating excitation of the core members 11 and 12 by source 17 provides the minor hysteresis loops 40, 41, 42, 43 and 44. This excitation is at a rate typically lying in the range of from 50 to 1000 kilocycles with the volt time integrals of the excitation signal being less than that required to exceed the switching threshold of the cores.

It may be appreciated that higher frequencies of excitation may be employed if one wishes to take the requisite measures in the cores. Such measures would typically entail using a ribbon construction to minimize eddy current losses and the selection of a core material having the requisite low loss at the indicated frequencies. The lower limit in the excitation rate may also be extended. As the frequency is reduced appreciably below 50 kilocycles, however, the production of the second harmonic component falls off to the point where it becomes masked with noise incident to operation of the core.

The switching threshold is, of course, a function of the coercive force of the cores. The effect of making the excitation less than the coercive force of the core is to cause the core, regardless of its remanent state, to reproducibly traverse closed minor hysteresis loops, as generally illustrated by the curves 40, 41, 42, 43 and 44. For convenience in illustration, the minor hysteresis loops are of exaggerated size in relation to the major hysteresis loop 39.

In a practical case, assuming full saturation to occur at 16,000 gauss a (range of 32,000 gauss between opposite saturations), the minor hysteresis loops may typically traverse a range of 300 gauss. Dependent upon core geometry and the magnetic materials employed which effect the corresponding coercive force, values as high as 800 to 1000 gauss may be used.

The centers of the minor hysteresis loops 40 through 44 are illustrated at different levels of remanence. The loop 42 in the center of the graph represents a zero remanent state while the curves 41 and 43 represents intermediate remanent states and 40 and 44 represent remanent states quite close to saturation. The second harmonic component produced as a result of the indicated high frequency excitation bears an approximately linear relationship to the magnitude of the remanence value. Since the phase of the second harmonic component reverses by approximately 180° when the remanent state changes from a positive polarity to a negative polarity, this phase relationship is subsequently used to eliminate the ambiguity in identifying positive and negative remanent states. In this manner, with phase sensitive detection of the second harmonic component, each of the remanent states throughout the range of operation of the core is uniquely defined.

Changes in the remanent state of the cores 11 and 12 are accomplished by means of the source 19 which applies adapt pulses to the winding 15. The adapt pulses have a predetermined volt-second value and exceed the current switching threshold, i.e., the coercive threshold of the core. Obviously they will have values which are substantially larger than the individual cycles of the excitation signal. These adapt pulses, in accordance with the invention, are all of bi-polar nature with the initial portion of the pulse being of a polarity in which stepping is desired by the final pulse portion being of reverse polarity, and of less magnitude. Both portions exceed the coercive threshold of the core. As will be subsequently explained, the initial pulse portion in excess of the coercive threshold should be near double the corresponding excess of the final pulse portion, with both pulses being of equal duration. In addition to exceeding the switching threshold, the stepping pulses are proportioned to produce an integral number of incremental changes in remanent condition as the core is stepped between saturated states. In practical cases, the magnitude of the bipolar pulse may assume values bringing about from 10 to 60 increments between the limits of saturation. Typically, the stepping pulses may have time durations lying within the range of from 100 microseconds per composite pulse to one millisecond. Magnetic loss usually sets the lower practical limits on time duration, while system speed of operation sets the upper practical limits.

As pointed out earlier, the analog signal output appears as a second harmonic component of the excitation voltage in the signal winding 15, mixed with other alternating voltage components. The voltages appearing in signal winding 15 are applied through the isolating resistance 22 to the transformer 24 which, together with elements 27, 28, and 29, provides a means for isolating the second harmonic component containing the analog information from other alternating components appearing in that winding including quadraturely related second harmonics that are spuriously produced. As pointed out earlier, these components 24, 27, 28 and 29, form a balanced demodulator arranged to synchronously detect the desired second harmonic component.

The signal voltage, which appears in the secondary 25 and 26 of the transformer 24, is applied to the terminals 34 and 35 of the rectifier 27. At the same time, the source 28 and the transformer 29 apply an alternating voltage of twice the frequency of excitation source 17 between the terminals 36 and 37 of the rectifier. The magnitude of this latter voltage is substantially greater than that of the second harmonic content of the signal. The phase of this latter voltage assumes either a substantially in phase or a substantially opposed phase relationship to the phase of the second harmonic signal component as the reversal of remanent condition on the cores 11 and 12 results in a corresponding reversal of the phase of the second harmonic component by approximately 180°.

When the source 28 is of such a phase that terminal 37 is of positive polarity and terminal 36 is of negative polarity, diodes C and D are both made strongly conductive and diodes A and B are rendered strongly non-conductive. If at the same moment signal voltage appearing in windings 25 and 26 is of positive polarity at terminal 35 and of negative polarity at terminal 34, then signal current will be permitted to flow through the lower secondary winding into the center tap output lead and a voltage negative with respect to ground will appear at the tap. The off condition of diodes A and B prevents current flow through the terminal 34, while the on condition of diodes C and D permits current flow in either direction through these diodes. Conduction of diodes C and D, continues regardless of signal polarity, and terminal 35 is thereby effectively referenced to ground.

When the phase of the voltage from the source 28 is reversed, the diodes A and B are now rendered strongly conductive and the diodes C and D rendered strongly non-conductive. At this moment, the second harmonic signal component is also of reversed polarity, and is now of positive polarity at terminal 34 and of negative polarity at terminal 35. The signal current will now be permitted to flow through the winding 25 toward the center tap and again a negative voltage will appear at the tap. With the indicated phase relation between the second harmonic signal component and the source 28 maintained through successive cycles, a unidirectionally negative output voltage will result.

When the cores 11 and 12 are stepped to an opposite remanent state (from that assumed in the discussion immediately above), the mutual phase relationship between the second harmonic signal component and the voltage from source 28 will be changed approximately 180°. In consequence oppositely directed signal current flows will take place under the control of the source 28 and the diodes subject to its control, and a uni-directionally positive output voltage will appear. In this manner, a positive or negative voltage will appear which uniquely defines the remanent states of the cores 11 and 12.

An additionel property of the indicated balanced demodulator is its suppression of orthogonally related components such as the orthogonal second harmonic component arising from imperfections in the matching of the cores 11 and 12.

The uni-directional voltage developed at the output tap of the transformer 24 is then passed through a low-pass filter comprising an inductor 30, a shunt capacitor 31, and load resistance 32. The filter serves to eliminate alternating components from the output, and aids in the derivation of the analog quantity representative of the magnitude of the second harmonic component.

The analog output utilization device 33 is connected to the output of this filter. It may take any of a number of different forms. If it it desired to utilize the output voltage for immediate indication, it may be simply a voltage indicator calibrated to indicate the desired analog quantity. The analog output utilization device 33 may also be a device which is controlled in proportion to an analog quantity supplied to it such as a processing controller. It may also be an additional stage of a computational device which uses the analog voltage as an input for further computation. One of the newest areas of computation for which the device is well suited is in the field of adaptive systems or in the construction of machines capable of "learning."

As implied by the placement of the minor hysteresis loops 40, 41, 42, 43 and 44 upon the vertical axis of the graph in FIGURE 2, it is preferred that the output reading be taken when no external field other than the alternating excitation field is being applied to the cores. During application of an adapt pulse shown at 48, 49, the magnetic state of the cores is being shifted along the path illustrated by dotted line 45. Assuming a start at the remanent point 46, which represents the remanent condition prior to the occurrence of the pulse (48, 49), the path is traced approximately horizontally toward the right limb of the major hysteresis loop. Upon encountering the major hysteresis loop, the trace continues approximately vertically along the major hysteresis loop until the initial portion 48 of the adapt pulse is terminated. During the second portion of the adapt pulse, the magnetic state of the core is swept approximately horizontally back to the opposite (and left) limb of the major hysteresis loop and it is decremented along that limb by an amount less than the original increment. Upon termination of the final portion of the composite pulse, the core assumes the remanent condition shown at higher remanent point 47, and the new minor hysteresis loop will center at 47.

During the application of the adapt pulse, noise is being generated in the output circuit which would tend to obscure an accurate reading. Immediately after termination of the stepping pulse, the core slips back to its normal remanent point at the vertical axis corresponding to a zero applied field condition. With square loop materials, the line traced between termination of the pulse and final remanent condition is practically parallel to the H axis, and there is usually insufficient slope to have any effect upon the output indication. Some ringing may exist during the period immediately after application of the stepping pulse, however, and whether non-square loop materials are used or not, some slight delay in reading is usually desirable.

When the cores are being stepped between successive remanent states, it is usually unnecessary to discontinue the high frequency excitation. This results because the high frequency excitation in the windings 13 and 14 produce opposing fluxes in the respective cores 11 and 12 so that whatever minor effect may occur in the remanent state of one core, the effect is largely offset by a substantially equal and opposite effect in the other core. The use of a large amount of feedback in feedback winding 16 increases the coercive threshold of the cores as seen by the adapt pulses and squares the effective B-H characteristic. Squaring the B-H characteristic makes that threshold substantially constant irrespective of remanent condition. The feedback greatly increases the requisite magnitude of the adapt pulse and results in substantial loading of the second harmonic output signal. However, its beneficial effects on linearizing the output characteristic and reducing the sensitivity of the device to interaction effects justifies its presence.

In a practical embodiment of the present invention, suitable for operation with composite pulses of 500 microseconds duration, spaced at 1 millisecond intervals, with a pulse amplitude adjusted to step the cores through 32 remanent states, the following values were found to provide satisfactory performance:

| | |
|---|---|
| Cores **11** and **12** | Effective core area .0076 cm.$^2$, core length 2.2 cm., formed of 1 mil tape, grain oriented 50% NiFe alloy. |
| Windings **13**, **14** and **15** | 10 turns #30 wire. |
| Winding **16** | One turn #26 wire, shorted upon itself. |
| Resistance **38** | 0.0 ohm (distributed resistance of winding **16**, adequate). |
| Source **17** | 1.0 volt, 500 kc. producing a current of 60 ma. |
| Resistance **18** | 0.0 ohm (the internal resistance of source **17** adequate). |
| Resistance **21** | 100 ohms. |
| Resistance **22** | Do. |
| Transformers **24** and **29** | Primary 80 turns #31 wire, secondary 80 turns center tapped #31 wire, core area .08 cm.$^2$, core length 4.02 cm. formed of ½ mil tape of 80% NiFe alloy. |
| Rectifier **27** | 4 type IN914 diodes with 4 200 ohm external resistances. |
| Source **28** | 1.0 volt, 1000 kc. |
| Inductor **30** | 1.0 millihenry. |
| Capacitor **31** | 0.1 microfarad. |
| Resistance **32** | Approximately 1000 ohms. |

Apparatus for generating the composite adapt pulses is illustrated in FIGURES 3(*a*), 3(*b*), and 3(*c*), and will now be described. The adapt pulse generator may be seen to comprise eight major blocks; an input trigger control 61; first and second monostable multivibrators 62 and 63; an add-subtract control 64, a bistable multivibrator 65; initial pulse and final pulse generators 66 and 67; and a summation network 68. The adapt pulse generator produces the specified number of composite pulses indicated by the setting of the input trigger control 61. These pulses have the polarity indicated by the setting of the add-subtract control 64. The principal waveforms are illustrated plotted upon a common timing axis in FIGURE 3(*b*).

The input trigger control is of conventional design and generates a succession of evenly spaced short duration pulses 70 as illustrated in FIGURES 3(*a*) and 3(*b*) and having a number in accordance with its setting. The setting may be manual or automatic. The short duration pulses 70 are supplied to operate the first monostable multivibrator 62, which has complementary outputs indicated at I and $\overline{I}$. The outputs I and $\overline{I}$ are a succession of spaced, rectangular pulse waveforms 71 and 72 respectively, illustrated in FIGURES 3(*a*) and 3(*b*). The initial portion of each rectangular pulse 71, 72 commences with the timing pulse 70. The outputs I and $\overline{I}$ of the first monostable multivibrator are then supplied to control the initial pulse generator 66.

The initial pulse generator 66, which is subject to I, $\overline{I}$ control is also provided with a phase (or polarity) control from the elements 64 and 65. The element 64 is an add-subtract control which may take any of a number of different forms including that of a simple pulse generator which produces a positive pulse to add and a negative pulse to subtract in response to a manual or automatic setting. The output pulse is coupled to the multivibrator 65 to trigger it into either of its two stable states. The bistable multivibrator 65 has two complementary outputs $\phi$ and $\overline{\phi}$, that are essentially D.C. voltage levels, as illustrated by the waveforms 73 and 74, and the $\phi$ output is coupled to initial pulse generator 66.

The initial pulse generator 66 produces a succession of unidirectional pulses at its output as shown by the waveform 75. The output pulses 75 are in numbers, equal to and in timing, coincident with the output pulses of the first monostable multivibrator 62. The $\phi$ output of the bistable multivibrator 65, controls the phase (or polarity) of the output pulses 75. While the initial pulse generator may take a variety of forms, one form will be more fully explained below. The pulses 75 produced by the initial pulse generator 66 become the initial portion of the composite pulse produced by the complete composite pulse generator.

The final pulse generator 67 is of similar design to the pulse generator 66 and its output pulses 78 become the final portion of the composite pulse. Pulse generator 67 is under the immediate control of the second monostable multivibrator 63 and the bistable multivibrator 65. The second monostable multivibrator 63 is similar in execution to the multivibrator 62. It is provided with complementary outputs F and $\overline{F}$ with the respective output waveforms being indicated at 76 and 77, in FIGURES 3(*a*) and 3(*b*). These outputs are coupled to pulse generator 67. The pulses 78 produced by the pulse generator 67 are thus made equal in number and timed to be coincident with the output pulses produced by the multivibrator 63. Since the time constants in multivibrator 63 are made equal to those of multivibrator 62, the durations of their respective output pulses are also made equal. Consequently the output pulses of the generators 66 and 67 are also of equal duration. The complementary phase control $\overline{\phi}$ from the bistable multivibrator 65 is coupled to the final pulse generator 67 and controls the phase (or polarity) of the output pulses 78.

The final pulse generator 67 is under the indirect and partial control of the first monostable multivibrator 62. An output from the first monostable multivibrator 62 is coupled to the input of the second monostable multivibrator 63 to initiate the pulse produced by the second monostable multivibrator 63 at the trailing edge of the multivibrator 62 output pulse. Coupling between the multivibrators 62 and 63 for this type of operation may be conveniently achieved by a differentiating connection and a pulse polarity selecting diode poled to pass the desired pulse created upon differentiation of the trailing edge of the output pulse. In addition to controlling the timing of pulses 76 and 77, the interconnection of the multivibrators 62 and 63 insures that the number of pulses 76 and 77 produced by the multivibrator 63 are equal to the total number of trigger pulses 70.

By the foregoing control connections, the initial pulse generator 66 and the final pulse generator 67 are arranged to provide pulses suitable for combination into the requisite composite waveform. The generator 66 produces a succession of uni-directional output pulses 75, numbered and timed with the trigger pulses 70 and having a phase or polarity set by the $\phi$ output of the multivibrator 65. The generator 67 at the same time is controlled to produce an equal number of uni-directional output pulses 78, initiated upon the termination of output pulses 75, and having a phase or polarity set by the $\bar{\phi}$ output of multivibrator 65, which polarity is always opposite to the polarity of the pulses produced by the initial pulse generator.

The two outputs from the initial pulse generator 66 and final pulse generator 67, now having the correct number, timing and polarity, are then combined with suitable adjustment being made in their relative magnitudes in the summation network 68, to form the desired composite output pulse 20.

FIGURE 3(*c*) indicates in greater detail a suitable configuration for the initial and final pulse generators 66, 67 and the summation network 68. The dotted outlines 66, 67 and 68 illustrated in FIGURE 3(*c*) outline the schematic wiring diagrams for the similarly numbered elements 66, 67 and 68 illustrated in block diagram form in FIGURE 3(*a*).

The initial pulse generator 66 comprises a source 91 of negative potential; a tapped adjustable voltage divider 92 coupled between source 91 and ground; a source 93 of positive potential; a tapped second voltage divider 94 coupled between source 93 and ground; four transistor gates 95, 96, 97 and 98; and an isolating summation network 99 coupled between the taps on voltage dividers 92 and 94, respectively.

The transistor gates 95 and 96 which function to produce the initial negative output pulse, are coupled to the tap on the voltage divider 92. Together they function as gates, grounding the tap when either (or both) are conductive. Transistor gate 95 is controlled by the I output pulses 71 and transistor gate 96 is controlled by the $\phi$ output 73. Either a positive voltage applied to one of the gates 95 or 96 or inputs of zero volts applied to both of these gates results in grounding the tap on voltage divider 92 as mentioned above. With both gates 95 and 96 non-conducting, the tap on voltage divider 92 becomes negative under the influence of source 91. The isolating summation network 99, which is coupled to the tap on voltage divider 92 thereupon produces a negative output pulse which is coupled to summation network 68.

Similarly, the transistor gates 97 and 98, which function to produce the initial positive output pulse, are coupled to the tap on the voltage divider 94. Together they function as gates, grounding the tap when either (or both) are conductive. Transistor gate 97 is controlled by the $\bar{I}$ output pulses 72 and transistor gate 98 is controlled by the $\phi$ output 73. A positive voltage on either gate 97 or 98 turns one on, and grounds the tap on the voltage divider 94. With both gates 97 and 98 non-conducting, the tap on voltage divider 94 becomes positive under the influence of source 93. The isolating summation network 99, which is also coupled to the tap on voltage divider 94, thereupon produces a positive output pulse which is coupled to summation network 68.

Thus, it may be seen that an initial pulse is generated in initial pulse generator 66, timed by the I and $\bar{I}$ pulse outputs of the first monostable multivibrator 62 and having a polarity selected by the phase output $\phi$ of bistable multivibrator 65. In order to adjust the magnitude of the negative pulse which is produced by the gates 95 and 96 to equal the magnitude of the positive pulse, which is produced by the gates 97 and 98, the voltage divider 92 is made adjustable.

The final pulse generator is similar to the initial pulse generator 66. It comprises a source 101 of negative potential; a tapped adjustable voltage divider 102 coupled between source 101 and ground; a source 103 of positive potential; a tapped second voltage divider 104 coupled between source 103 and ground; four transistor gates 105, 106, 107, 108; and an isolating summation network 109 coupled between the taps on voltage dividers 102 and 104, respectively.

The transistor gates 105 and 106 which function to produce the negative final output pulse, are coupled to the tap of the voltage divider 102. Together they function as gates grounding the tap when either (or both) are conductive. Transistor gate 105 is controlled by the F output pulses 76 and transistor gate 106 is controlled by the $\bar{\phi}$ output 74. Either a positive voltage applied to one of the gates 105 or 106 or inputs of zero volts applied to both of these gates results in grounding the tap on voltage divider 102 as mentioned above. With both gates 105 and 106 non-conducting, the tap on voltage divider 102 becomes negative under the influence of source 101. The isolating summation network 109, which is coupled to the tap on voltage divider 102 thereupon produces a negative output pulse which is coupled to summation network 68.

Similarly, the transistor gates 107 and 108 which function to produce the positive final output pulse, are coupled to the tap on voltage divider 104 and together function as gates, grounding the tap when either (or both) are conductive. Transistor gate 107 is controlled by the $\bar{F}$ output pulses 77 and transistor gate 108 is controlled by the $\bar{\phi}$ output 74. A positive voltage on either gate 107 or 108 turns on one gate and grounds the tap on voltage divider 104. With both gates 107 and 108 non-conducting, the tap on voltage divider 104 becomes positive under the influence of source 103. The isolating summation network 109, which is also coupled to the tap on voltage divider 104, thereupon produces a positive output pulse which is coupled to summation network 68.

Thus, it may be seen that a final pulse is generated and timed by the F and $\bar{F}$ pulse outputs of the second monostable multivibrator 63 and has a polarity selected by the phase output $\bar{\phi}$ of the bistable multivibrator 65, which selection makes it necessarily opposite to that of the initial pulse. In order to adjust the magnitude of the negative pulse which is produced by the gates 105 and 106 to equal the magnitude of the positive pulse which is produced by the gates 107 and 108, the voltage divider 102 is made adjustable. In order to adjust the magnitude of the final pulse relative to the initial pulse, an additional voltage divider 110 is provided shunting the isolating summation network 109. The output summation network 68 permits output adjustment and takes the form of a simple resistive load jointly coupled to the isolating summation networks 99 and 109.

The foregoing circuitry used in carrying out the elements 66, 67, 68 may have the circuit values indicated on the drawing. Since the gates 95, 96; 97, 98; 105, 106; and 107, 108 are similar in design, circuit values that are duplicated throughout the respective gates are only mentioned once.

The use of a composite pulse having a final portion of a polarity opposed to that of the initial portion facilitates the high degree of linearity achieved by applicant's novel apparatus. As explained, this linearity permits operation of the apparatus over an increased number of discrete remanent states.

The dimensioning of the composite pulse must be optimized for a given mode of operation in accordance with the following considerations. The degree of linearity that is required increases as the number of discrete remanent states is increased. The relative size of the two pulse portions of the composite pulse does affect the linearity of the operation and is controlled to optimize the linearity for the selected number of discrete remanent states. Thus, predetermining the number of remanent states dictates an optimum relative size between the pulse portions. It should not be overlooked, however, that the number of remanent states also dictates the absolute size of the pulse portions. These relationships, as will be explained in greater detail below, lead to an interaction in the settings when the apparatus is being initially adjusted and make systematic adjustment desirable. Additionally, the amount of feedback required increases as the number of remanent steps is increased; the feedback performing the usual function of insuring linearity of operation or effectively squaring the major hysteresis loop which is the same thing. The feedback also has an affect upon the absolute magnitudes of the applied pulses required and generally increases their magnitude.

Considering now the relative magnitudes between the initial and final pulse portions; it may be seen that the initial pulse portion should always exceed the final pulse portion in amplitude time product and both pulse portions should exceed the effective coercive threshold of the cores. The amplitude time product of the final pulse portion begins to exhibit a beneficial effect in linearizing the operation of the device at the point where it exceeds the coercive threshold of the core. The relation between pulse portions does have an optimum point, assuming that the number of remanent states and other core dimensions have been established. This optimum adjustment is usually achieved by visual adjustment made by oscilloscopic examination of the output of the apparatus. In particular, the apparatus is subjected to adapt pulses which recurrently step the core between opposite saturations. In the course of this stepping, the adapt pulses are adjusted such that a first output pulse, after stepping away from a saturation level is made equal to the other output pulses.

The method of systematically approaching the correct adjustment is to make the magnitude of the primary pulse portion slightly larger than is required to step the core in the desired number of steps. In other words, if one desires to operate the apparatus at 30 steps then one sets the primary pulse portions to achieve saturation in less than 30 steps, for example, 25 steps. Then one gradually increases the magnitude of the secondary portion of the pulse until linearity is achieved. If linearity is achieved, but in more than the desired number of steps, the initial pulse portion is slightly increased. Then the secondary pulse portion is gradually increased until linearity is again achieved. This process is repeated until linearity is achieved at the desired number of steps.

If at any stage of the adjustment a decrease in the initial pulse portion is required, it is first decreased. Then the final pulse portion is reduced to zero, from which point it is subsequently increased to achieve the desired linearity.

In practice, it is convenient for the initial and final pulse portions to be of equal duration. With this adjustment, the ratio between the initial and final pulse portions which are in excess of the applicable coercive threshold of the cores lies generally within the range of from 1.4 to 3. This range generally applies to arrangements having from 10 to 40 steps. If the pulse portions are of sufficient duration such that the variation of the coercive threshold of the core is small, then the requirement that the initial and final pulse portions be of equal duration is greatly relaxed. One should, however, avoid extremely long duration pulses where the magnetic field is set close to the coercive force. This places too great a premium upon linearity in the major hysteresis loop. In the practical embodiment illustrated, when 30 steps were obtained with equal duration pulse portions greater than 200 microseconds, the ratio is approximately two (1.9).

The mathematical description of the novel apparatus is straightforward when one makes the requisite simplifying assumptions. These simplifying assumptions introduce some error into the description. With these general reservations, which are not uncommon in magnetics, the foregoing description is undertaken.

At the outset, it is assumed that the effective major hysteresis loop is made to be rectangular. This is done by suitable selection of a core material, geometry and use of feedback. As as consequence of this assumption, it may be seen that the effective threshold of the cores is the same irrespective of the remanent state. In other words, applied pulses exceeding the effective threshold of the cores will step the cores to a new remanent state by an amount proportional to that excess:

$$(H_m - H_o)\tau \qquad (1)$$

where $H_m$ is the magnetic field of an applied pulse
$H_o$ is the effective coercive threshold of the cores
$\tau$ is the duration of the applied pulse.

The switching constant ($S_w$) of the core may be defined as a measure of the effectiveness of a pulse to change the remanent flux within the core by a given amount.

$$(H_{m_x} - H_{o_x})\tau_x = S_{w_x}/N_x \qquad (2)$$

In Equation 2, therefore, $N_x$ represents the number of applied pulses necessary to switch the core from one saturation extreme to the other. The subscript $x$ denotes dependency of all parameters upon a given pulse selection.

The initial pulse portion may then be substituted into (2) with the quantity $\tau_i$ shifted to the right hand side of the equation $$(H_{m_i} - H_{o_i}) = S_{w_i}/\tau_i N_i \qquad (3)$$

for convenience let us define the amplitude of the initial pulse portion in terms of excess over the coercive threshold:

$$H_i = (H_{m_i} - H_{o_i}) \qquad (4)$$

then:

$$H_i = S_{w_i}/\tau_i N_i \qquad (5)$$

Similarly, for the final pulse portion:

$$H_f = S_{w_f}/\tau_f N_f \qquad (6)$$

The net effect of the composite pulse formed by the initial pulse portion followed by the oppositely poled final pulse portion is:

$$H_i - H_f = \frac{S_{w_i}}{\tau_i - N_i} - \frac{S_{w_f}}{\tau_f N_f} \qquad (7)$$

If now, the pulse portions are selected to be of equal duration, and the switching constants are equal for such pulses—which assumption is usually true to within a few percent, then:

$$H_i - H_f = \frac{S_w}{\tau \frac{N_f N_i}{N_f - N_i}} = \frac{S_w}{\tau N_c} \qquad (8)$$

where $S_w$ is the common switching constant, $$\tau = \tau_i = \tau_f$$

and $N_c$ is the number of composite pulses required to switch the core between saturation states. Now from (8)

$$N_c = \frac{N_f N_i}{N_f - N_i} \qquad (9)$$

In solving the practical problem where operation with a valve of $N_c$ of thirty remanent states is desired, we use the approximate empirical constant:

$$N_f/N_i \sim 1.9 \quad (10)$$

and substitute it into expression (9).

This determines that:

$$N_f = 30(1.9) - 30 = 27$$
$$N_i = 27/1.9 \sim 14 \quad (11)$$

If the answer is desired in standard magnetic quantities, one may return to expression (2), and upon introducing the quantities for the core coercive thresholds, the switching constants, the pulse durations, and the newly determined numbers $N_f$ and $N_i$, one may obtain $H_{mi}$ and $H_{mf}$.

The apparatus may be built in a manner permitting adjustment of the pulse relationships as earlier described. In the usual case, the adjustment once made need not be reset unless the number of counts is to be altered. Since the magnetic components are not presently available with precisely reproducible properties, some flexibility in adjustment of the apparatus is usually desirable.

The pulse magnitude relationships which have been set forth in the foregoing mathematical development and which are achieved by adjusting the apparatus by the technique earlier described, lead to an optimum setting in which a minimum initial portion and a minimum final porton of the composite pulse to achieve linearity is obtained. It has been observed that jointly increasing the amplitude of the initial and final portions of the composite pulse by equal increments beyond these minimums has little or no effect upon the linearity of operation of the inventive apparatus. The beneficial effect of the invention in achieving linearity, therefore, applies to these later situations. The mathematical effect is to cause the ratio between the magnetic field intensity of the initial pulse portion in excess of the effective coercive threshold to the magnetic field intensity of the final portion of said pulse in excess of the effective coercive threshold to decrease toward one.

The invention has been found to be of general application to stepped core devices employing a wide range of square loop materials in their construction. The numerical values which have been established herein are for 50% nickel-iron alloys in a grain oriented tape configuration. These values apply over substantial dimensional ranges of these cores. However, as one goes from one magnetic alloy to another, the numerical ratios may differ. Accordingly, while the indicated numerical ratios may furnish a general indication of the pulse dimensions for use with other core materials, one would practice the invention by setting the secondary pulse to eliminate disproportionality in output indication after polarity reversal, as previously described. The invention is therefore of quite general application to stepped core devices.

Although the invention has been described with respect to certain specific embodiments, it will be appreciated that various modifications and changes may be made by those skilled in the art without departing from the spirit and scope of the invention.

What is claimed as new and desired to be secured by Letters Patent in the United States is:

1. In combination, a saturable magnetic core structure having a hysteresis characteristic, alternating electrical excitation means for cycling said core structure over closed minor hysteresis loops for the production of substantial second harmonic content in the resulting rate of change of flux as a function of the remanent state of said core structure; stepping means coupled to said core structure for changing its remanent state by application of stepping pulses thereto; said stepping means including means for applying a composite stepping pulse having an initial portion of one polarity and a subsequent portion of opposing polarity and lesser magnitude; and analog output means for deriving an electrical quantity representative of the magnitude of the second harmonic component of said rate of change of flux.

2. The combination set forth in claim 1 wherein said composite stepping pulse of said stepping means is proportioned such that both the initial and the final portions of said pulse provide a magnetic field intensity in excess of the effective coercive threshold of said core structure, and wherein said final pulse portion has a magnitude set to eliminate the disproportionality in output indication following count reversal and thereby linearize the operation of said combination.

3. The combination set forth in claim 1 wherein said composite stepping pulse of said stepping means is proportioned such that both the initial and the final portions of said pulse provide a magnetic field intensity in excess of the effective coercive threshold of said core structure.

4. The combination set forth in claim 1 wherein said core structure is of 50% nickel-iron magnetic alloy, said composite stepping pulse of said stepping means being proportioned such that both the initial and the final portions of said pulse provide a magnetic field intensity in excess of the coercive threshold of said core structure and said excess of said initial pulse lies within the range of from 1.4 to 3 times the excess of said final pulse portion.

5. The combination set forth in claim 1 wherein said core structure is of 50% nickel-iron magnetic alloy, said composite stepping pulse of said stepping means being proportioned such that both the initial and final portions of said pulse provide a magnetic field intensity in excess of the coercive threshold of said core structure and said excess of said initial pulse is in the region of twice the excess of said final pulse portion.

6. The combination set forth in claim 1 wherein said core structure comprises a pair of closed loop cores, said stepping means comprising a first winding coupled jointly to said cores, and said excitation means comprising a second and a third winding mutually poled to develop opposing fluxes within said first winding.

7. The combination set forth in claim 1 wherein said core structure comprises a pair of closed loop cores, said stepping means comprising a first winding coupled jointly to said cores, and said excitation means comprising a second and a third winding mutually poled to develop opposing fluxes within said first winding; said combination having in addition a feedback winding coupled jointly to said cores.

8. The combination set forth in claim 1 wherein said core structure comprises a pair of closed loop cores, said stepping means comprising a first winding coupled jointly to said cores, and said excitation means comprising a second and third winding mutually poled to develop opposing fluxes within said first winding; and said analog output means comprises synchronous detection means; said combination having in addition, a feedback winding coupled jointly to said cores.

9. In combination, a saturable magnetic core structure having a hysteresis characteristic, alternating electrical excitation means for cycling said core structure over closed minor hysteresis loops for the production of substantial second harmonic content in the resulting rate of change of flux as a function of the remanent state of said core structure; stepping means coupled to said core structure for changing its remanent state by application of stepping pulses thereto; said stepping means including means for applying a composite stepping pulse having an initial portion of one polarity and a subsequent portion of opposing polarity and lesser magnitude; and analog output means for deriving an electrical quantity representative of the magnitude of the second harmonic component of said rate of change of flux; and wherein said final pulse portion has a magnitude set to eliminate the disproportionality in output indication following count reversal and thereby linearize the operation of said combination.

References Cited

UNITED STATES PATENTS

| | | | |
|---|---|---|---|
| 2,808,578 | 10/1957 | Goodell et al. | 340—174 |
| 2,897,380 | 7/1959 | Neitzert | 340—174 |
| 3,075,084 | 1/1963 | De Miranda et al. | 307—88 |
| 3,116,475 | 12/1963 | Oshima et al. | 340—174 |
| 3,276,001 | 9/1966 | Crafts | 340—174 |
| 3,311,899 | 3/1967 | Olsson et al. | 340—174 |
| 3,321,749 | 5/1967 | Overn | 340—174 |
| 3,346,854 | 10/1967 | Crafts et al. | 340—174 |

STANLEY M. URYNOWICZ, *Primary Examiner.*

U.S. Cl. X.R.

340—174